(12) United States Patent
Reymann (10) Patent No.: US 9,151,591 B2
(45) Date of Patent: Oct. 6, 2015

(54) POSITION MEASURING SYSTEM AND ASSOCIATED MEASURING METHOD FOR DETECTING AN INDICATED POSITION OF A LINEARLY MOVABLE GUIDE ELEMENT

(75) Inventor: Markus Reymann, Nuremberg (DE)

(73) Assignee: Areva GmbH, Erlangen (DE)

( * ) Notice: Subject to any disclaimer, the term of this patent is extended or adjusted under 35 U.S.C. 154(b) by 327 days.

(21) Appl. No.: 13/884,737

(22) PCT Filed: Oct. 24, 2011

(86) PCT No.: PCT/EP2011/005349
§ 371 (c)(1),
(2), (4) Date: Jul. 2, 2013

(87) PCT Pub. No.: WO2015/062409
PCT Pub. Date: May 18, 2012

(65) Prior Publication Data
US 2013/0271120 A1    Oct. 17, 2013

(30) Foreign Application Priority Data

Nov. 10, 2010  (DE) .......................... 10 2010 050 765

(51) Int. Cl.
*G01B 7/14* (2006.01)
*G01D 5/20* (2006.01)
(Continued)

(52) U.S. Cl.
CPC ................ *G01B 7/14* (2013.01); *G01D 5/2033* (2013.01); *G01F 23/74* (2013.01); *G21C 7/10* (2013.01); *G21C 17/10* (2013.01); *Y02E 30/39* (2013.01)

(58) Field of Classification Search
CPC ............ G01B 7/003; G01B 7/12; G01B 7/14; G01B 3/205; G01B 3/20; G01D 5/2266; G01D 5/202; G01D 5/2073; G01D 5/12; G01D 5/20; G01D 5/22; G01D 5/249; G01D 5/2086
USPC ................... 324/207.12–207.25; 340/870.32, 340/870.34; 336/15, 45
See application file for complete search history.

(56) References Cited

U.S. PATENT DOCUMENTS 3,048,818 A   8/1962  Burckhardt et al.
3,594,740 A * 7/1971  Comeau et al. .......... 340/870.27
(Continued)

FOREIGN PATENT DOCUMENTS

CN         1898533 A    1/2007
CN       101801495 A    8/2010
(Continued)

*Primary Examiner* — Tung X Nguyen
*Assistant Examiner* — Thang Le
(74) *Attorney, Agent, or Firm* — Laurence A. Greenberg; Werner H. Stemer; Ralph E. Locher (57) ABSTRACT

A position measuring system detects an extreme position of a guide rod which extends along a path that is rectilinear relative to a guide system and can be moved along the rectilinear path, wherein the system operates reliably, and requires a minimum of electrical lines. The position measuring system is equipped with a plurality of sensor elements and a magnetic element, wherein the magnetic element is configured to form a magnetic field. The magnetic element is connected to the guide rod. Each sensor element is configured to detect a magnetic field within a detection region, a field strength of the magnetic field being greater at the location of the sensor element than a predefined threshold value. At least one sensor element is connected to the guide system and is arranged in an environment of the path. A corresponding measuring method uses the position measuring system to detect the extreme positions.

11 Claims, 4 Drawing Sheets

(51) Int. Cl.
*G01F 23/74* (2006.01)
*G21C 7/10* (2006.01)
*G21C 17/10* (2006.01)

(56) References Cited

U.S. PATENT DOCUMENTS

| | | | |
|---|---|---|---|
| 3,656,074 A * | 4/1972 | Bevilacqua et al. | 376/258 |
| 3,906,469 A * | 9/1975 | Kronk | 340/870.27 |
| 4,014,741 A | 3/1977 | Foxworthy et al. | |
| 4,064,451 A * | 12/1977 | Foxworthy | 324/207.13 |
| 4,068,163 A * | 1/1978 | Foxworthy | 324/207.13 |
| 4,604,576 A * | 8/1986 | Barrault | 324/207.16 |
| 6,571,626 B1 | 6/2003 | Herford | |
| 6,825,656 B2 | 11/2004 | Hanisch | |
| 2010/0276352 A1 | 11/2010 | Mendel et al. | |

FOREIGN PATENT DOCUMENTS

| | | |
|---|---|---|
| DE | 2202519 A1 | 8/1972 |
| DE | 27 19 933 A1 | 11/1977 |
| DE | 4208888 A1 | 9/1993 |
| DE | 195 48 509 A1 | 7/1997 |
| DE | 200 09 155 U1 | 8/2000 |
| DE | 10 2004 041 107 A1 | 10/2005 |
| GB | 1347329 A | 2/1974 |
| JP | S5211393 A | 1/1977 |
| KR | 1020030030890 A | 4/2003 |
| RU | 1806410 A3 | 3/1993 |

* cited by examiner

POSITION MEASURING SYSTEM AND ASSOCIATED MEASURING METHOD FOR DETECTING AN INDICATED POSITION OF A LINEARLY MOVABLE GUIDE ELEMENT

BACKGROUND OF THE INVENTION

Field of the Invention

The invention relates to a position measuring system and an associated measuring method for detecting an indicated position, in particular a maximum and minimum position, of a linearly movable guide element.

In a nuclear facility, for example in a nuclear power plant facility, linearly movable control rods are used to control chain reactions of nuclear disintegration processes in a reactor in the case of which particle radiation—in particular neutron radiation—is emitted, by absorbing radiation. The further that such control rods, which are typically arranged bundled into groups, are pushed between the nuclear fuel elements, the larger the components of the particle radiation driving the chain reaction further that are absorbed, and so the chain reaction correspondingly proceeds more slowly, and can ideally be brought to a stop when the control rods are in the fully extended position. State and process of the chain reaction are therefore a function of the extended positions of the linearly movable control rods, and are determined thereby. An exact knowledge of the positions of the control rods—in particular the respective maximum extended positions—is therefore relevant for a regulation of the operating state and therefore, in particular, for safety.

Position measuring systems for control rods generally comprise devices for the application of electromagnetically inductive measuring methods in the case of which use is respectively made of the fact that the temporal variation of a magnetic field in an electrical conductor induces an electric voltage. Such a device usually comprises one or more primary coils for providing such a magnetic field. A control rod in the region of the magnetic field is used to vary the magnetic field, the effect of this being to vary the voltage induced in induction coils arranged along the linear travel path. The position of the control rod can be determined from the magnitude of the induction voltage. In order to detect the lower and/or the upper end position of the control rod, separate coil groups are mostly set up, their measurement signals being transmitted via respectively separate lines to the evaluation unit. A voltage signal from said coils indicates whether the control rod has reached the lower or the upper end position.

A disadvantage of the above described position measuring system is based on the fact that the detection of the positions of the control rod requires a plurality of secondary coils whose signal lines must be guided out of the inner reactor region—the so-called containment. In particular, the coils for detecting the end positions of the control rod require additional measuring lines. Moreover, it is disadvantageous that, depending on the actual position of the control rod, the voltage signal of the induction coil varies continuously in the vicinity of the minimum or maximum extended position of the end of the control rod. Consequently, although the magnitude of the voltage signal gives a rough indication of the minimum or maximum extended position of the control rod, the signal is, however, always still present in attenuated form when the control rod is no longer located in its minimum or maximum extended position, for example whenever the control rod is withdrawn from the reactor by a certain length of path. The inductive measuring method is therefore frequently too inaccurate for a precise and unique detection of end position.

BRIEF SUMMARY OF THE INVENTION

A first object of the invention is to specify a position measuring system for detecting an indicated position, in particular an extreme position, of a control rod which can be moved along a rectilinear path, said system requiring as low a number of measuring lines as possible, and being as accurate and reliable as possible. The position measuring system should, in particular, be capable of integration in a simple way into existing inductive position measuring systems.

A second object of the invention is to specify a method for determining an indicated position, in particular an extreme position, of a control rod which can be moved along a rectilinear path, said system being as accurate and reliable as possible.

The first object is achieved according to the invention by the features of the claims. Accordingly, there is provided a position measuring system for detecting an extreme position of a guide rod which extends along a path that is rectilinear relative to a guide system and can be moved along the rectilinear path, having a number of sensor elements and having at least one magnetic element, in which the magnetic element is set up to form a magnetic field, the magnetic element is connected to the guide rod, the or each sensor element is in each case designed within a detection region to detect a magnetic field whose field strength is greater at the location of the sensor element than a predefined threshold value, and at least one sensor element is connected to the guide system and is arranged in an environment of the path.

The invention proceeds from the consideration of coupling a magnetic field to the guide rod locally with the aid of a magnetic element and, by means of detecting the magnetic field by an external sensor element immovably connected to the guide system, of detecting the corresponding position of the guide rod relative to the guide system. In particular, discrete position values of the guide rod can be detected in this way, for example an extreme position.

The position of the guide rod is defined as the position of a stationary reference point relative to the guide rod, the reference point having precisely one spatial coordinate relative to the rectilinear path. The reference point is preferably selected at the location of the guide rod at which there is arranged any desired magnetic element that has, however, been permanently selected. This selection is unique given only one magnetic element. The last named special selection of the reference point does not constitute a limitation of generality. Given a different selection of the reference point, the measured position values are displaced by comparison with the values for the special selection of the reference point by a constant length that is given by the distance between the magnetic element and the reference point.

The detection of position continues to be unique, since the sensor element reacts to detect when and only when a magnetic field whose field strength at the location of the sensor element is greater than the threshold value is in the detection region. During a change in the position of the guide rod that is greater than the spatial selectivity of the sensor element it follows that there is no continuous signaling of the sensor element. Rather, it is a reliable binary item of information of the type "end position reached: yes/no?" that is enabled.

If a plurality of sensor elements are installed at one and the same location of the guide system, the degree of redundancy a detection of position is correspondingly increased. A position measuring system according to the invention can therefore be excluded in principle with a high degree of redundancy, and is correspondingly reliable. In this case, however, it is necessary to accept the system as having the disadvantage of a relatively large number of lines.

Moreover, the inventive position measuring system can be combined with known systems for measuring position, in particular with systems for applying inductive measuring methods, it being possible, in particular, to have recourse to already existing signal lines (multiple use).

The magnetic element is preferably designed as a permanent magnet. Otherwise as for a coil that forms an electromagnet—a permanent magnet does not require any electrical conductors which, as additional lines on or in the guide rod need to be guided out of the containment. The number of possible additional lines which are to be guided out of the containment for the position measuring system therefore remains limited to the sensor elements.

The magnetic element is expediently connected at an end to the guide rod. In such a position, the magnetic element can be connected with particular ease to the guide rod and can—for example, as a permanent magnet—be joined onto the guide rod at an end in the form of a magnetic plate or a magnetic disk. Moreover, it is possible thereby to detect the extreme position of the guide rod for a sensor element at the location of a possible extreme displacement of the corresponding end of the guide rod relative to the guide system.

Consequently, the detection region of at least one sensor element expediently detects the end of the guide rod arranged in the extreme position.

In a suitable embodiment of the position measuring system, the guide rod can be moved along the rectilinear path between a minimum extended position and a maximum extended position. The two extreme extended positions of the guide rod can therefore be detected by means of suitably localize sensor elements.

It is preferred to provide at least one sensor element as a noncontact sensor, in particular as a reed contact element. A reed contact element comprises two contact tongues whose core is generally respectively formed from a ferromagnetic metal. A magnetic field in the region of the reed contact element—caused by the permanent magnet on the control rod—leads to an attraction of the two contact tongues. If the field strength of the magnetic field overshoots a threshold value, contact closure is made between the two contact tongues such that an electric control current can flow via the contact. In order to improve the conductivity and to diminish premature contact closure, the contact tongues are usually coated with a noble metal, for example copper or silver, or are enclosed a a glass bulb that is evacuated or filled with protective gas. Reed contact elements can be scaled over a wide size range, and are robust and available cost effectively.

In a preferred variant embodiment of the position measuring system, at least one sensor element is connected to an electrical circuit arrangement, which circuit arrangement is connected to an evaluation and/or control unit, and comprises a number of electric induction coils. Electric induction coil(s) is/are designed to be applied in an inductive measuring operation. Owing to the circuitry of the connection, the or each induction coil can be driven and controlled by the sensor element via one and the same control unit. It is possible in this way to achieve a high degree of redundancy and/or a high spatial resolution of the determination of position without the need to guide additional electric lines out of the containment.

Moreover, the circuit arrangement preferably comprises at least one ohmic resistance unit which forms a series circuit with at least one induction coil, and which forms a circuit loop with at least one contact sensor. Since the induction coil also has an ohmic resistance, the total resistance in a series circuit of the ohmic resistance unit and induction coil is given as the sum of the two resistances. Since the contact sensor forms a circuit loop with the ohmic resistance unit, the ohmic resistance unit is bridged and therefore short circuited when the contact sensor is closed, and so in this case only the ohmic resistance of the induction coil features in the measurable total resistance. The topology of the circuit arrangement therefore images a detection of the contact sensor onto a discontinuous change in resistance so that, for example, it is possible to detect when an extreme position of the guide rod is reached with the aid of such a sudden variation in the resistance value, which variation can be measured with simple means.

In a particularly suitable development of the position measuring system, the circuit arrangement comprises two ohmic resistance units which form a series circuit with an induction coil, one of the two ohmic resistances respectively being connected to in each case one end (terminal) of the induction coil, and comprises a plurality of contact sensors, each contact sensor forming a circuit loop with one of the ohmic resistances. In particular, two contact sensors are provided, and each contact sensor forms a circuit loop with precisely one ohmic resistance unit. Such a circuit topology constitutes a special case of the circuit topology explained in the last section, which are suitable for identifying two different sensor signals, for example in order to detect a minimum and a maximum position of the guide rod. In particular, the two ohmic resistance units have different ohmic resistance values, and so it is possible to detect from the magnitude of the variation of the total resistance value which of the two contact sensors forms an electrical contact closure. If more than two contact sensors are provided, there exists more than one circuit loop for at least one ohmic resistance unit. The short circuit of the ohmic resistance unit occurs whenever only one of the contact sensors forms an electrical contact closure. This is suitable, in particular, for increasing the degree of redundancy when the detection regions of the two contact sensors overlap.

Moreover, the control unit expediently comprises a current source for feeding an electric direct current into the circuit arrangement, and/or comprises a first measuring unit for detecting the DC voltage component of a total voltage in the circuit arrangement, and/or comprises a second measuring unit for detecting the AC voltage component of a total voltage in the circuit arrangement. The ohmic resistance value of the circuit arrangement and the time profile thereof can be determined from the direct voltage detected by means of the first measuring unit and the time profile thereof, and from the direct current fed into the circuit arrangement, whose magnitude is known. In particular, discontinuous profiles and therefore detections of one or each contact sensor are thereby determined. The second measuring unit particularly detects an alternating voltage induced by the induction coil from an alternating magnetic field. It is possible thereby, in particular, to determine the temporal profile of the amplitude of the alternating voltage, and thus to derive a variation in the induced alternating magnetic field. The latter is the subject matter of an inductive measuring operation.

The control unit is preferably connected to a second circuit arrangement, which circuit arrangement comprises an electrical coil, and the control unit is preferably designed to form and control an electric current in the second circuit arrangement. Such a circuit arrangement is suitable, in particular, for carrying out an inductive measuring operation. To this end, the control unit produces an alternating electric current that is guided through the electrical coil (primary coil), and an alternating magnetic field is induced in this case.

Furthermore, the electrical coil is preferably aligned and arranged parallel to the rectilinear path. For example, the coil can be designed to enclose the rectilinear path, the result being that a magnetic field induced by the coil substantially encompasses the path.

In an expedient embodiment of the position measuring system, the guide rod is provided as a control rod of a nuclear facility, and the guide system comprises a pressure resistant guide tube enclosing the control rod. Such a position measuring system serves the purpose of—preferably redundant—measurement of the position of a control rod, in particular for measuring and verifying an end position. It is expedient for a plurality of reed contact elements to be connected with contact closure in the region of the end position with the outside of the guide tube, and it is expedient for the electrical coil to enclose the guide tube. The position of a linearly movable control rod in the guide tube can be detected inductively by means of the control unit and the circuit arrangements. The reaching and maintenance of the end position is detected by the reed contact elements, measured by means of the first circuit arrangement and evaluated with the aid of the control unit.

The second of the objects mentioned at the beginning is achieved according to the invention by the features of the claims. Accordingly, a method is specified for detecting an indicated position, in particular an extreme position of a guide rod which extends along a path that is rectilinear relative to a guide system and can be moved along the rectilinear path, in which a magnetic field is produced by a magnetic element connected at an end to the guide rod, and a magnetic field is detected by a sensor element connected to the guide system, preferably by using a position measuring system in accordance with the first object of the invention.

In a particularly expedient development of the method, the control unit generates a primary AC voltage, the AC voltage is fed to the circuit arrangement, an induction voltage is generated in an induction coil, the control unit determines the ohmic resistance of the circuit arrangement, a circuit loop is closed with electrical contact closure to a contact sensor by a magnetic field at the location of the contact sensor, and a variation in the DC voltage component of a total voltage in the circuit arrangement is determined by the control unit.

The advantages attained with the invention consist, in particular, in specifying a measuring system for determining the rod position in a nuclear reactor which is divergent from measuring systems common to date, which manages through the multiple use of existing signal transmission paths with a particularly low number of lines and containment penetrations, and which works in a particularly robust and at the same time accurate and reliable fashion, especially given the use of reed contacts or reed sensors.

An exemplary embodiment of an inventive position measuring system is given below.

BRIEF DESCRIPTION OF THE SEVERAL VIEWS OF THE DRAWING

Here, in a greatly simplified schematic in each case.

DESCRIPTION OF THE INVENTION

Mutually corresponding parts in FIG. 1 to FIG. 4 are provided with identical reference symbols.

Figure 1:
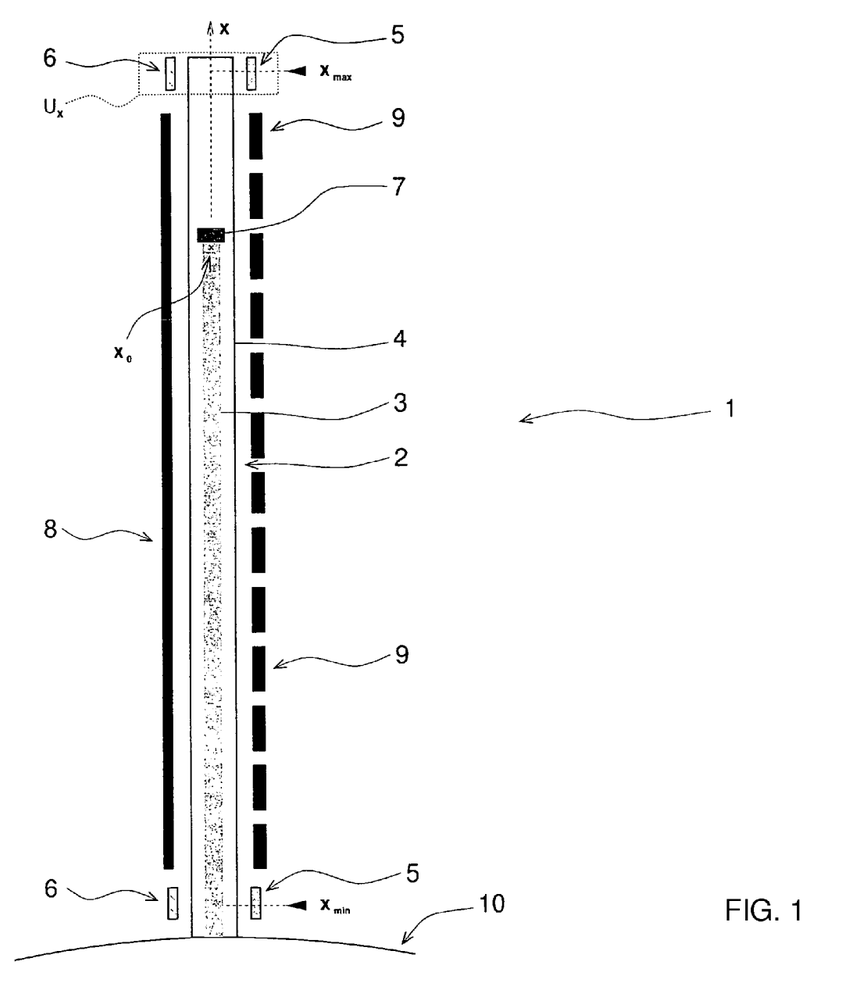
FIG. 1 shows a position measuring system for detecting an extreme position $x_{min}$, $x_{max}$ of a control rod.

FIG. 1 shows a position measuring system 1 for detecting an extreme position $x_{min}$, $x_{max}$ of a control rod 3 which can be moved linearly between a minimum extended position $x_{min}$ and a maximum extended position $x_{max}$ relative to a fixed guide system 2 along the rectilinear path x. The position of the control rod 3 is identified in this case by the coordinate of a reference point $x_0$ relative to the rectilinear path x. The reference point $x_0$ lies on the end of the control rod 3 and marks the latter. The guide system 2 comprises a pressure stable guide tube 4 that sheaths the control rod 3. Arranged respectively in the region of the minimum and the maximum extended position $x_{min}$ or $x_{max}$ are a first reed contact element 5 and, in addition, a second reed contact element 6. The two reed contact elements 5 and 6 lie in an environment $U_x$ of the rectilinear path x. A permanent magnet 7 is arranged on the control rod 3 in the region of the reference point $x_0$. The reference point $x_0$ lies at $x_{min}$ in the minimum extended position $x_{min}$ of the control rod 3, and the reference point $x_0$ lies at $x_{max}$ in the maximum extended position $x_{max}$ of the control rod 3. In both cases, the reed contact elements 5 and 6 form an electrical contact closure through the magnetic field of the permanent magnet. Also visible is a pressure wall 10, connected to the position measuring system 1, of a nuclear reactor.

Arranged parallel to the guide tube 4 is an electrical coil 8 that is set up to form an alternating magnetic field, the alternating magnetic field serving the purpose of an inductive measuring operation. The coil 8 is also denoted as a field generating primary coil. Furthermore, a plurality of induction coils 9, which are also denoted as secondary coils, are arranged parallel to the guide tube 4, in which an electric voltage signal is respectively induced from an alternating magnetic field. The system of coils 8 and 9 serves in a known way to determine the positioning of the control rod 3 on its travel path in the direction x for a number of intermediate positions, lying between the extreme positions $x_{min}$ $x_{max}$ and, if appropriate, also for the extreme positions $x_{min}$ $x_{max}$ themselves. The number of the induction coils 9 arranged behind one another along the direction x determines the spatial resolution of the measurement of the position. By contrast, monitoring of the end position is taken over in a divergent redundant way, or else exclusively or primarily by the reed contact elements 5 and, if appropriate, by the redundant reed contact elements 6. In order to minimize the requisite lines, the reed contact elements 5 are connected specifically in this case into the coil circuit of the induction coils 9, and connected to a suitable evaluation and/or control unit 11, as is made clear by the following description. In order to simplify the description only a single induction coil 9 is considered in this case. The generalization to a plurality of induction coils, connected electrically in series, for example, as in FIG. 1 or 2 is, however, possible straight away.

Figure 2:
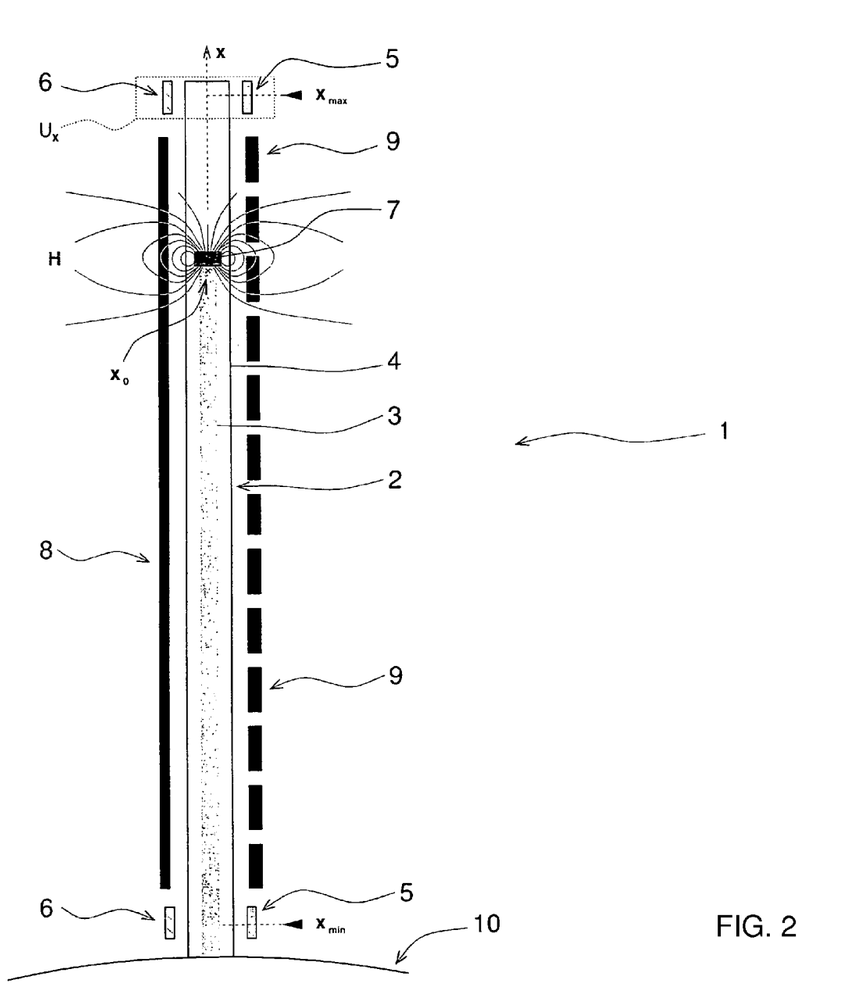
FIG. 2 shows the position measuring system according to FIG. 1 with a depiction of magnetic field lines of a permanent magnet mounted on the control rod.

FIG. 2 shows the position measuring system 1 according to FIG. 1 with the profile of the field lines of the magnetic field H of the permanent magnet 7. All further details are identical to the details in FIG. 1.

Figure 3:
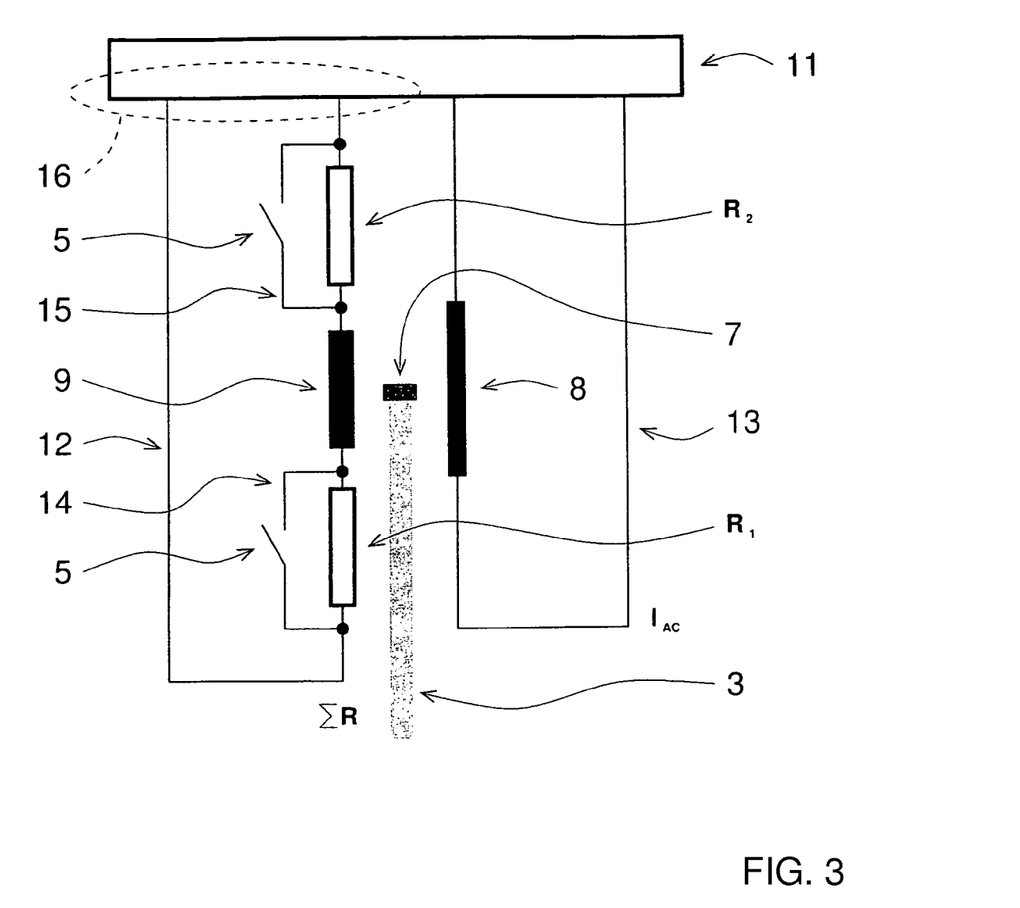
FIG. 3 shows a partial view of the position measuring system according to FIG. 1 with a control unit and with a first and a second associated circuit arrangement.

FIG. 3 represents a partial view of the position measuring system 1 according to FIG. 1 with a control unit 11 and with a first and a second associated circuit arrangement 12 and 13, respectively. The control rod 3 with the permanent magnet 7 connected to it at an end is illustrated between the two circuit arrangements 12 and 13, the arrangement of the control rod 3 being merely illustrative in this case and not corresponding to a real geometric arrangement. The first circuit arrangement 12 comprises an induction coil 9 that is connected in series with a first ohmic resistance unit $R_1$ and with a second ohmic resistance unit $R_2$, one of the resistance units $R_1$, $R_2$ respectively being connected to an end of the induction coil 9 in each case. Together with a reed contact element 5 in each case, the first ohmic resistance unit $R_1$ and the second ohmic resistance unit $R_2$ form a first and second circuit loop 14 and 15, respectively. Depending on which of the reed contact elements 5 is open or closed—something which depends on the position of the control rod 3, compare FIG. 1 and FIG. 2—in the first case the circuit loop 14 is open and the circuit loop 15 is closed, in the second case the circuit loop 14 is closed and the circuit loop 15 is open, and in the third case the first circuit loop 14 is open and the circuit loop 15 is open.

If the illustrated reed contact elements 5 correspond to those in FIG. 1 and FIG. 2 for the extreme positions of the control rod 3, only one of the cases can be implemented at a given instant—depending on the position of the control rod 3. In the first case, the resistance unit $R_1$ is electrically short circuited, in the second case the resistance unit $R_2$ is electrically short circuited, and in the third case neither of the resistance units $R_1$, $R_2$ is electrically short circuited, and so the ohmic total resistance $\Sigma R$ of the series circuits is given, depending on the case, from the sum of the ohmic resistance values of the induction coil 9 and of the second resistance unit $R_2$, or the first resistance unit $R_1$ and the first and second resistance units $R_1$ and $R_2$. If, in particular, the ohmic resistance values of the two ohmic resistance units $R_1$, $R_2$ are selected to differ from one another, the value of the resistance sum $\Sigma R$ differs for all cases. The control unit 11 has a circuit group 16 for determining the value of the resistance sum $\Sigma R$, compare FIG. 4.

The second circuit arrangement 13 comprises the electrical coil 8 that is designed to provide an alternating magnetic field by means of an alternating electric current $I_{AC}$ formed by the control unit 11. An alternating magnetic field induces an alternating voltage in the induction coil 9 which can be evaluated in the circuit group 16, compare FIG. 4.

Figure 4:
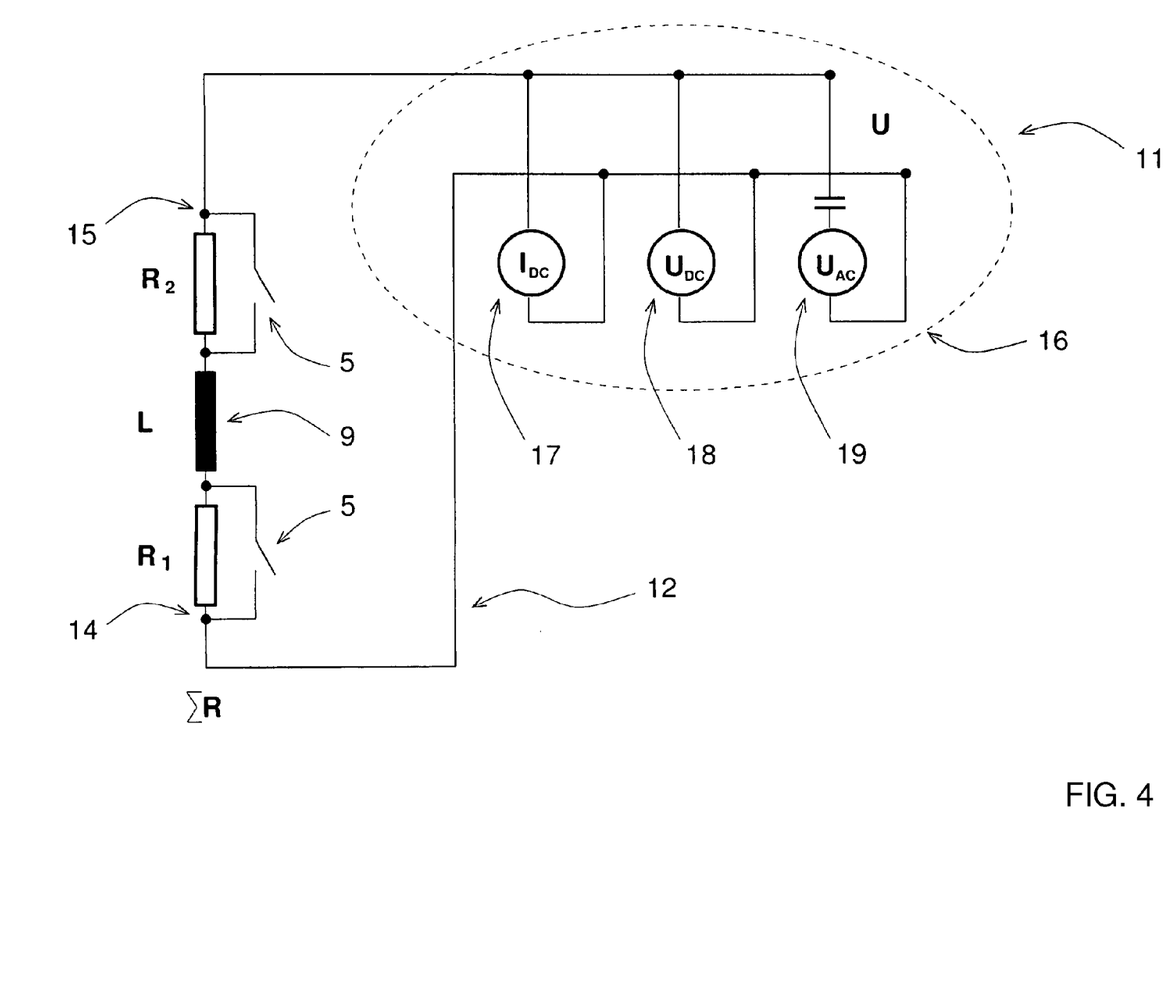
FIG. 4 shows a detailed view of a subregion of the control unit and of the first associated circuit arrangement.

FIG. 4 shows a detailed view of the circuit group 16, which is assigned to the control unit 11 and is connected to the first circuit arrangement 12, compare FIG. 3. The circuit group 16 comprises a current source 17 for providing a direct current $I_x$ in the circuit arrangement 12, a first measuring unit 18 for detecting the DC voltage component $U_{DC}$ of the total voltage U present in the circuit arrangement 12, and a second measuring unit 19 for detecting the AC voltage component $U_{AC}$ of the total voltage U present in the circuit arrangement 12. The further details correspond to the details in FIG. 3. The inductor L of the induction coil 9 is marked separately. The ohmic total resistance $\Sigma R$ of the circuit arrangement 12 is determined with the aid of the current source and the first measuring unit 18. As outlined above, the reaching of the end positions $x_{min}$, $x_{max}$ can be detected reliably therefrom. The AC voltage $U_{AC}$ that is induced in the inductor L is determined with the aid of the second measuring unit 19. It is possible thereby also to monitor the intermediate position(s), fixed by the arrangement of the induction coil(s) 9, between the two end positions $x_{min}$, $x_{max}$.

Separate lines for the reed contact elements 5 acting as end position switches and end position detectors, respectively, are economized by the integration of the reed contact elements 5 into the coil circuit of the first circuit arrangement 12 and by the multiple use, effected thereby of signal transmission paths already present. It can also be said that the inductive position determining system known per se with the coils 8 and 9 is expanded in this way without increasing the number of lines by a divergent end position measuring system, that is to say one based on another functional principle. Instead of the end positions $x_{min}$, $x_{max}$ it would, of course, also be possible to monitor other indicated positions with the aid of the reed contact elements 5. Instead of the reed contact elements 5, 6, it could also be possible to make use of other end position switches or end position sensors which electrically to bridge the resistance units $R_1$, $R_2$ if required and as a function of the position of the control rod 3.

It is self-evident that the circuit diagrams are schematic in nature, and that the corresponding electronics would have additional components in practice which, however, are not of decisive importance for the functional principle of interest here.

LIST OF REFERENCE SYMBOLS

1 Position measuring system
2 Guide system
3 Guide rod, control rod
4 Guide tube
5 Sensor element, contact sensor, reed contact element
6 Reed contact element
7 Magnetic element, permanent magnet
8 Electrical coil
9 Induction coil
10 Pressure wall
11 Control unit
12 First circuit arrangement
13 Second circuit arrangement
14 First circuit loop
15 Second circuit loop
16 Circuit group
17 Current source
18 First measuring unit
19 Second measuring unit
x Rectilinear path
$x_{min}$ Extreme position, minimum extended position
$x_{max}$ Extreme position, maximum extended position
$x_0$ Reference point
$U_x$ Environment of the rectilinear path
H Magnetic field
$R_1$ First ohmic resistance unit
$R_2$ Second ohmic resistance unit
$\Sigma R$ Total resistance, resistance sum
$I_{AC}$ Alternating current
$I_{DC}$ Direct current
U Total voltage
$U_{AC}$ AC voltage, AC voltage component
$U_{DC}$ DC voltage, DC voltage component
L Inductor

The invention claimed is:

1. A position measuring system for detecting an indicated position of a guide rod extending along a rectilinear path being rectilinear relative to a guide system and can be moved along the rectilinear path, the position measuring system comprising:
   a number of reed contact elements;
   at least one magnetic element for forming a magnetic field, said magnetic element connected to the guide rod;
   at least one of said reed contact elements is in each case configured within a detection region to detect the magnetic field whose field strength is greater at a location of said one reed contact element than a predefined threshold value when said at least one magnetic element approaches said one reed contact element, at least one of said reed contact elements disposed in an environment of the rectilinear path;

an inductive measuring system for determining a position of the guide rod disposed in the environment of the rectilinear path, said inductive measuring system having a number of electric induction coils; and a circuit configuration having at least one ohmic resistance unit forming a series circuit with at least one of said electric induction coils, and forming a circuit loop with at least one of said reed contact elements.

2. The position measuring system according to claim 1, wherein said magnetic element is a permanent magnet.

3. The position measuring system according to claim 1, wherein said magnetic element has an end connected to the guide rod.

4. The position measuring system according to claim 1, wherein the detection region of at least one of said reed contact elements detects an end of the guide rod disposed in the indicated position.

5. The position measuring system according to claim 1, wherein the guide rod can be moved between a minimum extended position and a maximum extended position.

6. The position measuring system according to claim 1, wherein said at least one ohmic resistance unit is one of two ohmic resistance units forming said series circuit with said electric induction coil, one of said two ohmic resistance units respectively being connected to in each case one end of said electric induction coil, and said series circuit containing a plurality of said reed contact elements, each said reed contact element forming a circuit loop with one of said ohmic resistance units.

7. The position measuring system according to claim 1, further comprising a circuit group for determining an ohmic total resistance of said circuit configuration.

8. The position measuring system according to claim 1, further comprising a control unit containing:

a current source for feeding a direct current into said circuit configuration;

a first measuring unit for detecting a DC voltage component of a total voltage in said circuit configuration; and a second measuring unit for detecting an AC voltage component of the total voltage in said circuit configuration.

9. The position measuring system according to claim 8, further comprising a further circuit configuration connected to said control unit, said further circuit configuration having an electrical coil and configured to form and control an electric current in said further circuit configuration.

10. The position measuring system according to claim 9, wherein said electrical coil is aligned and disposed parallel to the rectilinear path.

11. A position measuring system for detecting an indicated position of a control rod of a nuclear facility, the position measuring system comprising:

a guide system, the control rod extending along a rectilinear path being rectilinear relative to said guide system, said guide system containing a pressure resistant guide tube enclosing the control rod;

a number of reed contact elements;

at least one magnetic element for forming a magnetic field, said magnetic element connected to the control rod;

at least one of said reed contact elements is in each case configured within a detection region to detect the magnetic field whose field strength is greater at a location of said reed contact element than a predefined threshold value, at least one of said reed contact elements connected to said guide system and is disposed in an environment of the rectilinear path;

an inductive measuring system for determining a position of the control rod disposed in the environment of the rectilinear path, said inductive measuring system having a number of electric induction coils; and a circuit configuration disposed in the environment of the rectilinear path and having at least one ohmic resistance unit forming a series circuit with at least one of said electric induction coils, and forming a circuit loop with at least one of said reed contact elements.

* * * * *